United States Patent
Koutsimanis et al.

(10) Patent No.: US 11,792,775 B2
(45) Date of Patent: Oct. 17, 2023

(54) MEASUREMENT PROCEDURES FOR OPERATION IN UNLICENSED SPECTRUM

(71) Applicant: Telefonaktiebolaget LM Ericsson (publ), Stockholm (SE)

(72) Inventors: Chrysostomos Koutsimanis, Stockholm (SE); Bruhtesfa Godana, Stavanger (NO); Muhammad Kazmi, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 17/574,520

(22) Filed: Jan. 12, 2022

(65) Prior Publication Data
US 2022/0141820 A1    May 5, 2022

Related U.S. Application Data

(62) Division of application No. 14/908,167, filed as application No. PCT/SE2015/051028 on Sep. 29, 2015, now abandoned.
(Continued)

(51) Int. Cl.
*H04W 72/0446* (2023.01)
*H04W 76/27* (2018.01)
(Continued)

(52) U.S. Cl.
CPC ......... *H04W 72/0446* (2013.01); *H04L 5/008* (2013.01); *H04L 5/0048* (2013.01);
(Continued)

(58) Field of Classification Search
CPC ... H04B 7/18506; H04L 5/001; H04L 5/0007; H04L 5/008; H04L 5/0048; H04L 5/0051;
(Continued)

(56) References Cited

U.S. PATENT DOCUMENTS

| 2003/0091019 A1 | 5/2003 | Takano |
|---|---|---|
| 2006/0165113 A1 | 7/2006 | Nonoyama |

(Continued)

FOREIGN PATENT DOCUMENTS

| WO | 2013112983 A2 | 8/2013 |
|---|---|---|
| WO | 2014035415 A1 | 3/2014 |

(Continued)

OTHER PUBLICATIONS

Author Unknown, "Technical Specification Group Radio Access Network; Evolved Universal Terrestrial Radio Access (E-UTRA); Physical channels and modulation (Release 11)," Technical Specification 36.211, Version 11.4.0, Sep. 2013, 3GPP Organizational Partners, 120 pages.

(Continued)

*Primary Examiner* — Khoa Huynh
(74) *Attorney, Agent, or Firm* — Withrow & Terranova, PLLC (57) ABSTRACT

A novel way for transmitting physical signals by a transmitter node (20, 40) based on the LBT principle, and informing a receiver node (30, 50) in cases where the transmission of the physical signals has been deferred or does not occur in a certain time resource, is presented. A transmitter node (20, 40) listens to a wireless radio channel during a first time resource. If there is no activity, or if the activity is below a threshold, the transmitter node (20, 40), in a second time resource, transmits an indicator indicating that one or more physical signals are also transmitted in the second time resource. A receiver node (30, 50) detects if an indicator is present in the time resource. If the receiver node (30, 50) detects the indicator, the receiver node (30, 50) may also receive and use one or more reference signals in the current time resource for doing one or more tasks.

17 Claims, 6 Drawing Sheets

Related U.S. Application Data (60) Provisional application No. 62/059,495, filed on Oct. 3, 2014.

(51) Int. Cl.
    *H04L 5/00*     (2006.01)
    *H04W 16/14*     (2009.01)
    *H04W 74/08*     (2009.01)

(52) U.S. Cl.
    CPC ....... *H04W 16/14* (2013.01); *H04W 74/0808* (2013.01); *H04W 76/27* (2018.02); *H04L 5/001* (2013.01); *H04L 5/0007* (2013.01)

(58) Field of Classification Search
    CPC H04L 5/0053; H04W 16/14; H04W 72/0446; H04W 74/0808; H04W 74/0816; H04W 76/27
    See application file for complete search history.

(56) References Cited

U.S. PATENT DOCUMENTS

| | | | |
|---|---|---|---|
| 2009/0109906 A1 | 4/2009 | Love et al. | |
| 2011/0032838 A1 | 2/2011 | Liu et al. | |
| 2011/0111781 A1* | 5/2011 | Chen | H04B 7/02 455/507 |
| 2013/0163543 A1 | 6/2013 | Freda et al. | |
| 2013/0301491 A1 | 11/2013 | Bashar et al. | |
| 2013/0343288 A1 | 12/2013 | Ratasuk et al. | |
| 2015/0016239 A1 | 1/2015 | Yi et al. | |
| 2016/0036617 A1* | 2/2016 | Luo | H04L 5/0048 375/260 |
| 2016/0050004 A1* | 2/2016 | Mallik | H04W 72/042 370/329 |
| 2016/0249350 A1 | 8/2016 | Koutsimanis et al. | |
| 2017/0265082 A1 | 9/2017 | Jiang et al. | |

FOREIGN PATENT DOCUMENTS

| | | |
|---|---|---|
| WO | 2016048222 A1 | 3/2016 |
| WO | 2016048227 A2 | 3/2016 |

OTHER PUBLICATIONS

Author Unknown, "Technical Specification Group Radio Access Network; Evolved Universal Terrestrial Radio Access (E-UTRA); Physical layer procedures (Release 11)," Technical Specification 36.213, vol. 11.4.0, Sep. 2013, 3GPP Organizational Partners, 182 pages.
Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.5.0, Sep. 2013, 3GPP Organizational Partners, 347 pages.
Non-Final Office Action for U.S. Appl. No. 14/908,167, dated Jul. 10, 2018, 10 pages.
Final Office Action for U.S. Appl. No. 14/908,167, dated Jan. 10, 2019, 13 pages.
Advisory Action and AFCP 2.0 Decision for U.S. Appl. No. 14/908,167, dated Mar. 4, 2019, 4 pages.
Non-Final Office Action for U.S. Appl. No. 14/908,167, dated Jun. 13, 2019, 15 pages.
Final Office Action for U.S. Appl. No. 14/908,167, dated Nov. 8, 2019, 18 pages.
Advisory Action for U.S. Appl. No. 14/908,167, dated Feb. 13, 2020, 3 pages.
Non-Final Office Action for U.S. Appl. No. 14/908,167, dated May 15, 2020, 14 pages.
Final Office Action for U.S. Appl. No. 14/908,167, dated Nov. 25, 2020, 16 pages.
Advisory Action for U.S. Appl. No. 14/908,167, dated Mar. 8, 2021, 3 pages.
Non-Final Office Action for U.S. Appl. No. 14/908,167, dated Mar. 31, 2021, 17 pages.
Examiner-Initiated Interview Summary for U.S. Appl. No. 14/908,167, dated Jul. 2, 2021, 3 pages.
Final Office Action for U.S. Appl. No. 14/908,167, dated Oct. 12, 2021, 20 pages.
Extended European Search Report for European Patent Application No. 15847061.7, dated Jun. 25, 2018, 7 pages.
Extended European Search Report for European Patent Application No. 20170288.3, dated Jul. 20, 2020, 6 pages.
International Search Report and Written Opinion for International Patent Application No. PCT/SE2015/051028, dated Jan. 19, 2016, 10 pages.
International Preliminary Report on Patentability for International Patent Application No. PCT/SE2015/051028, dated Dec. 21, 2016, 7 pages.
Advisory Action for U.S. Appl. No. 14/908,167, dated Dec. 17, 2021, 4 pages.
Examination Report for European Patent Application No. 20170288.3, dated Feb. 15, 2022, 4 pages.

\* cited by examiner

MEASUREMENT PROCEDURES FOR OPERATION IN UNLICENSED SPECTRUM

This application is a divisional of U.S. patent application Ser. No. 14/908,167, filed Jan. 28, 2016, which is a 35 U.S.C. § 371 national phase filing of International Application No. PCT/SE2015/051028, filed Sep. 29, 2015, which claims priority to Provisional U.S. Patent Application No. 62/059,495 filed 3 Oct. 2014, the disclosures of which are incorporated herein by reference in their entireties.

TECHNICAL FIELD

The solution presented herein relates generally to handling reference signals in a wireless communication network, and more particularly to handling such reference signals in unlicensed frequency bands.

BACKGROUND

In Carrier Sense Multiple Access (CSMA) protocols for frame based wireless access technologies, sensing the energy of the wireless medium necessarily precedes any access to the wireless medium. For example, low sensed energy indicates the availability of a wireless radio channel for data transmissions. Long Term Evolution (LTE) systems deployed in unlicensed spectrum bands must make use of such Medium Access Control (MAC) protocols for data and/or control channels, as well as physical signals, also referred to herein as reference signals.

In existing solutions in LTE, a network node (e.g., a base station, an evolved NodeB (eNodeB), etc.) transmits physical signals (e.g., a Cell-specific Reference Signal (CRS), Primary Synchronization Signal (PSS), Secondary Synchronization Signal (SSS), Channel State Information RS (CSI-RS), Multi-Broadcast Single-Frequency Network RS (MBSFN RS), Discovery RS (DRS), etc.) regardless of whether other transmissions are ongoing. The network node transmits the physical signals in a predetermined way, and all UEs in Radio Resource Control (RRC) idle as well as in RRC connected states know the exact position of the physical signals in both the time and frequency domains. Certain signals, like CSI-RS, are semi-statically configured. The network node always transmits such semi-statically configured signals at the indicated time-frequency location according to the configuration provided to the UE, e.g., via RRC signaling.

The mandatory transmission of signals conflicts with the Listen Before Talk (LBT) procedure that must be used in some cases, e.g., where LTE is deployed in unlicensed bands. Specifically, in the License-Assisted LTE (LA-LTE) case, each network node must listen before occupying the radio channel by means of any transmission including data and/or control channels, and including physical signals. Even though physical signals are much more sparse in the time-frequency domain, they can still produce an unacceptable amount of interference with signals from the neighboring network nodes (e.g., other LTE node(s), Wireless Local Area Network (WLAN) access point, etc.), and disturb their own transmissions. So, it may happen that the network node defers the transmission of physical signals as well after listening to the channel if the channel is found to be occupied (i.e., activity level is detected). In that case, the UEs, which are not aware that physical signals were deferred or were not transmitted, will still try to estimate them and use them in various physical measurement procedures. Such estimations will be erroneous and will have a bias because the actual physical signals were not transmitted. This in turn leads to a degraded network performance as several functions, e.g., mobility, positioning, network planning, etc., heavily rely on the accuracy of UE radio measurement results. Hence, improvements are needed for LBT-type scenarios.

SUMMARY

The solution presented herein proposes a novel way for transmitting reference signals (e.g., physical signals such as CRS, CSI-RS, PSS/SSS, DRS, etc.) by a transmitter node based on the LBT principle, and informing a receiver node in cases where the transmission of the reference signals (e.g., physical signals) has been deferred or does not occur in a certain time resource (e.g., subframe, time slot, or symbol). The transmitter node and the receiver node implement the method as elaborated below.

A transmitter node listens to a wireless radio channel or detects activity on the wireless radio channel during an LBT slot in a first time resource (e.g., a first subframe). If there is no activity, or if the activity is below a threshold, the transmitter node, in a second time resource (e.g., second subframe), transmits an indicator (e.g., a preamble, which could be a sequence containing a cell ID) indicating that one or more reference signals (e.g., one or more physical signals) are also transmitted in the second time resource, and transmits the one or more reference signals in the second time resource. But, if the wireless radio channel is found to be occupied (e.g., the activity is above a threshold), then the transmitter node refrains from transmitting any indicator as well as the reference signals in the second time resource.

A receiver node at the beginning of each time resource, which carries reference signals, first detects if an indicator is present in the time resource. If the receiver node detects the indicator, the receiver node may also receive and use one or more reference signals in the current time resource for doing one or more tasks. Otherwise, in the absence of the indicator, the receiver node does not use any signals in the current time resource for performing any tasks. The receiver node may instead use its resources (e.g., processor, memory, etc.) during the time resource not containing the indicator for performing other tasks, e.g., processing previously received data, processing data to be transmitted by the receiver node in upcoming subframes, saving battery by turning off one or more circuit components.

One exemplary embodiment comprises a method, implemented in a transmitter node configured to communicate with a receiver node via a wireless radio channel. The method comprises determining whether the wireless radio channel is idle during a first time resource. If the wireless radio channel is idle during the first time resource, the method comprises subsequently transmitting, in a second time resource, a first indicator and one or more first references signals from the transmitter node. The first indicator is for alerting the receiver node to the presence of the one or more first reference signals in the second time resource, where the second time resource occurs after the first time resource.

Another exemplary embodiment comprises a transmitter node configured to communicate with a receiver node via a wireless radio channel. The transmitter node comprises an activity detection circuit and a transmission circuit. The activity determination circuit is configured to determine whether the wireless radio channel between the transmitter node and the receiver node is idle during a first time resource. The transmission circuit is configured to subsequently transmit a first indicator and one or more first reference signals in a second time resource if the wireless radio channel is idle during the first time resource. The first indicator is for alerting the receiver node to the presence of the one or more first reference signals in the second time resource, where the second time resource occurs after the first time resource.

Another exemplary embodiment comprises a method, implemented in a receiver node configured to communicate with a transmitter node via a wireless radio channel. The method comprises determining whether a first indicator is present in a first time resource received from the transmitter node via the wireless radio channel. If the first indicator is present in the first time resource, the method comprises using the one or more first reference signals present in the first time resource to execute one or more tasks.

Another exemplary embodiment comprises a receiver node configured to communicate with a transmitter node via a wireless radio channel. The receiver node comprises a processing circuit configured to determine whether a first indicator is present in a first time resource received from the transmitter node via the wireless radio channel. If the first indicator is present in the first time resource, the processing circuit is configured to use the one or more first reference signals present in the first time resource to execute one or more tasks.

Another exemplary embodiment comprises a computer program product stored in a non-transitory computer readable medium for controlling a transmitter node. The computer program product comprises software instructions which, when run on the transmitter node, causes the transmitter node to determine whether a radio channel between the transmitter node and a receiver node is idle during a first time resource, and subsequently transmit an indicator from the transmitter node if the radio channel is idle during the first time resource. The indicator is for alerting the receiver node to the presence of one or more reference signals in the second time resource, where the second time resource occurs after the first time resource.

Another exemplary embodiment comprises a computer program product stored in a non-transitory computer readable medium for controlling a receiver node. The computer program product comprises software instructions which, when run on the receiver node, causes the receiver node to determine whether an indicator is present in a first time resource received from a transmitter node via a wireless radio channel. If the indicator is present in the first time resource, the software instructions cause the receiver node to use one or more reference signals present in the first time resource to execute one or more tasks.

DETAILED DESCRIPTION

The solution presented herein involves a wireless communication network comprising a transmitter node and a receiver node that communicate via a wireless radio channel. In some embodiments, the transmitter node comprises a network node/radio network node, e.g., a radio base station (RBS), and the receiver node comprises a remote wireless communication device, e.g., a user equipment (UE). In other embodiments, the transmitter node comprises the remote wireless communication device and the receiver node comprises the network node. The remote wireless communication device referred to herein may comprise any type of wireless device capable of communicating with a network node or another remote wireless communication device using one or more wireless radio signals. Exemplary remote wireless communication devices include, but are not limited to, a UE, a target device, a device-to-device (D2D) UE, a machine-type UE or UE capable of machine-to-machine (M2M) communication, a sensor equipped with UE, a Personal Digital Assistant (PDA), a Tablet, a mobile terminal, a smart phone, a laptop embedded equipment (LEE), a laptop mounted equipment (LME), USB dongles, Customer Premises Equipment (CPE), etc. The network node may comprise any type of node used for wireless communications with a remote wireless device. Exemplary network nodes include, but are not limited to, a base station, radio base station, base transceiver station, a centralized controller, a core network node, Mobility Management Entity (MME), base station controller, network controller, evolved Node B (eNodeB), NodeB, relay node, access point, wireless access point, radio access point, Ultra-Dense Network/Software Defined Network (UDN/SDN) radio access node, Remote Radio Unit (RRU), Remote Radio Head (RRH), Operations Support System (OSS), Operation & Maintenance (O&M), Self-Organizing Network (SON), positioning node, Evolved Serving Mobile Location Center (E-SMLC), etc. It will be appreciated that the following describes the problems and the solutions in terms of a transmitter node and a receiver node, which may interchangeably be referred to as a network node and a UE, respectively.

Figure 1:
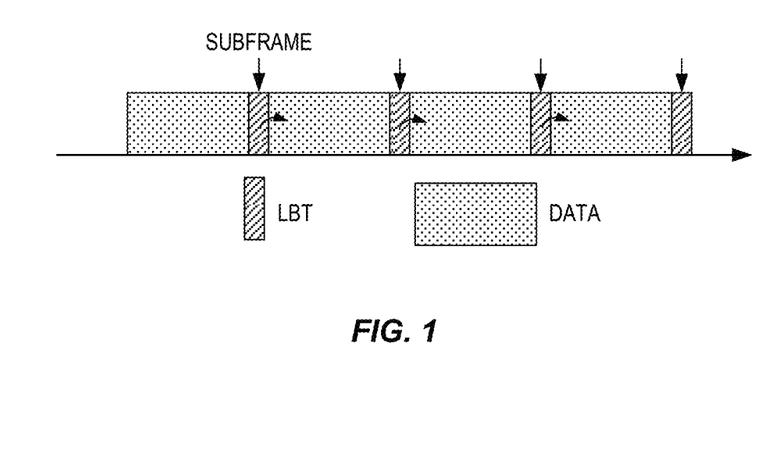
FIG. 1 shows a schematic diagram of an exemplary subframe comprising data and an LBT slot.

The following generic terms are used throughout this disclosure when describing various embodiments. First, this disclosure uses the term "time resource." During a time resource, any radio signals can be transmitted within a certain time duration (T0). Examples of a time resource include, but are not limited to, a time slot, subframe, symbol, frame, group of time slots, group of symbols, group of subframes, group of frames, group of frames, etc. Each time resource also contains a Listen Before Talk (LBT) slot or LBT time period during which the transmitter node listens for and detects activity. The LBT time period generally has a variable duration and, e.g., may be generally located at the end of the time resource, as shown in FIG. 1. This disclosure also uses the term "reference signal" (RS). A reference signal may comprise any type of "physical signal." Non-limiting examples of a RS include CRS, PSS/SSS, DRS, CSI-RS, MBSFN RS, etc. The RSs are used by the receiver node for executing one or more tasks, e.g., performing one or more radio measurements. This disclosure also uses the term "indicator." The indicator may comprise any kind of known signal or known sequence of signals or known signal encoded with or representing a known sequence. For example, the signal or sequence may be pre-determined. The indicator may also be interchangeably referred to as a channel indicator, pre-amble, RS indicator, RS presence indicator, RS Presence Indicator Channel (RPICH), etc. Network operations in the unlicensed spectrum refer to operations where the transmitter node transmits and/or receives signals from the receiver node over a radio channel that belongs to an unlicensed spectrum.

A CSMA protocol is a probabilistic MAC protocol where access to the channel is achieved by first sensing the channel and then transmitting data, control information, reference signals, etc., in a subsequent time resource if the channel was found to be free. The sensing of the channel is realized by measuring the energy of the channel over a certain period of time, e.g., by listening to the channel. If the measured energy is found to be below a predetermined threshold, then the channel is considered to be free. Hence, there is no other ongoing data transmission, which means the channel is not used by any other nearby network node. In this case, the transmitter node that listened to the channel is able to occupy the channel and use it for transmissions. In the opposite case, where the measured energy is above the predetermined threshold, the channel is considered to be busy and the transmitter node is not permitted to occupy the channel. Instead, the transmitter node will wait (defer) until the channel becomes available. Typically, a random back-off counter is employed, where the transmitter node measures the channel until the counter expires. If the channel is found to be free during this time period, then the transmitter node can access the channel. The random back-off counter concept is a contention mechanism that allows multiple users to measure the channel for different time periods and avoid systematic collisions. The CSMA protocol described above is also known as Listen-Before-Talk (LBT), which means that every transmitter node having access to the channel by means of transmitting data must first "listen" to determine if the channel is available "before talking." The solution presented herein applies to all scenarios where a transmitter node must first "listen" to a radio channel before occupying the radio channel.

Recently, the interest in deploying LTE on unlicensed bands has increased. The data traffic explosion as well as the comfort of operating a single Radio Access Network (RAN) has driven many operators and telecom vendors into the concept of expanding LTE to unlicensed bands and unlocking the vast amount of available spectrum there. The concept builds upon Carrier Aggregation (CA), where a licensed based LTE carrier is aggregated with an unlicensed LTE carrier. Thus, the crucial control signaling goes through the licensed Component Carrier (CC), and the unlicensed CC (or Secondary CC (SCC)) is used as a data rate booster. The above concept is known as License-Assisted LTE (LA-LTE) or LTE-Unlicensed (LTE-U). LA-LTE must coexist and share the channel in a fair manner with other systems deployed also on the same frequency bands, such as WiFi, radar systems, etc. CSMA or LBT is considered to be an interesting alternative that can be adopted by LA-LTE systems and fairly share the channel.

LBT can be performed periodically with a period equal to one Transmission Time Interval (TTI). The duration of the listening in an LBT slot is typically on the order of tens to hundreds of μsec. Variable listening time durations can be employed in order to avoid systematic collisions. The listening time duration corresponds to a fraction of one LTE OFDM symbol or up to a few LTE OFDM symbols, where each LTE OFDM symbol has duration of about 71 μsec. In other words, each LTE subframe is time divided into two parts, where a first part carries data and a second part implements the listening procedure. The listening occurs, e.g., at the end of the current subframe and determines whether data transmissions can continue, e.g., in the next subframe. Hence, the data transmission in subframe K is determined by the outcome of the listening that occurred during the end of a previous subframe, e.g., subframe K−1. FIG. 1 shows a schematic diagram of an exemplary LBT slot at the end of each LTE subframe.

LTE transmits a number of downlink physical signals on a regular basis. These downlink physical signals are used in various physical layer procedures. The physical signals are predetermined symbols inserted in known positions in the DownLink (DL) time-frequency grid. A physical signal comprises of a set of resource elements used by the physical layer, but it does not carry information originating from higher layers. In general a physical signal is any kind of reference signal, which may also interchangeably be called a pilot signal or a pilot sequence. A non-limiting example of a physical signal is the Cell specific Reference Signal (CRS). CRSs are transmitted regularly on every subframe (or TTI equal to 1 ms) by each cell. They have a predefined density in the frequency and time domain, and thus occupy specific places within a Resource Block (RB). CRSs are not pre-coded like normal data and are always transmitted at full power. Another non-limiting example of a physical signal is a Channel State Information Reference Signal (CSI-RS). CSI-RSs were introduced in LTE Rel.10, and are used for channel estimation used in CSI acquisition. CSI-RSs are defined in a number of configurations, where each configuration corresponds to a specific duplet of Resource Elements (REs) within an RB. CSI-RSs are transmitted with a predetermined period in time, which is defined by upper layers and is signaled to the UE through Radio Resource Control (RRC) signaling. Yet another non-limiting example of a physical signal is the Primary Synchronization Signal (PSS) and Secondary Synchronization Signal (SSS). These signals are transmitted once every 5 msec, which means that two subframes (subframes 0 and 5) in each radio frame are used for their transmission. Both the PSS and the SSS occupy 72 subcarriers located in the middle of the system bandwidth. Based on PSS/SSS, the UE acquires the Physical Cell Identity (PCI), time slot, and frame synchronization, which will enable the UE to read the system information from a particular cell. Other non-limiting examples of physical signals include the Discovery Reference Signal (DRS), Demodulation RS (DMRS), Positioning RS (PRS), Multi-Broadcast Single-Frequency Network RS (MBSFN RS), etc.

In LTE, the UE uses one or more downlink physical signals for performing one or more tasks, e.g., radio measurements. The measurements performed by the UE are used for one or more purposes, e.g., to establish and keep the connection, to ensure the quality of a radio link, for cell change, for cell reselection, for positioning, etc. The measurements are also used in RRC idle state operations, e.g., cell selection, cell reselection (e.g., between Evolved-Universal Terrestrial Radio Access Networks (E-UTRANs), between different Radio Access Technologies (RATs), and to non-3GPP ($3^{rd}$ Generation Partnership Project) RATs), and Minimization of Drive Test (MDT), and also in RRC connected state operations, e.g., for cell change (e.g., handover between E-UTRANs, handover between different RATs, and handover to non-3GPP RATs). Additional non-limiting examples of tasks performed using RS(s) are provided later in the description.

As previously noted, the mandatory transmission of signals, e.g., via unlicensed frequency bands, is problematic for scenarios bound by the LBT principle. For example, in the LA-LTE case, each transmitter node must listen before occupying the radio channel by means of any transmission including both data or control channels, and reference signals as well. If the transmitter node determines the radio channel is not idle, and thus defers transmissions until the radio channel is idle, the receiver node currently has no way to know that the transmitter node did not, in fact, transmit the reference signals. Thus, the receiver node will still try to use reference signals in a received subframe to try to execute various tasks. The estimations resulting from such processing will be erroneous and will have a bias because the actual reference signals were not transmitted, which in turn leads to a degraded network performance as several functions, e.g., mobility, positioning, network planning, etc., rely heavily on UE radio measurement results.

The solution presented herein solves this problem by having a transmitter node dynamically provide a corresponding receiver node with an indicator in a time resource, e.g., a subframe, when the transmitter node determines during a previous time resource, e.g., the immediately preceding subframe, that the wireless radio channel is idle, e.g., via an LBT procedure. The indicator indicates to the receiver node that the radio channel was idle, and that the received subframe contains one or more reference signals for use by the receiver to execute one or more tasks. Thus, the receiver node can use the received reference signals to execute the task(s) when the time resource with the reference signals also includes the indicator.

Figure 2:
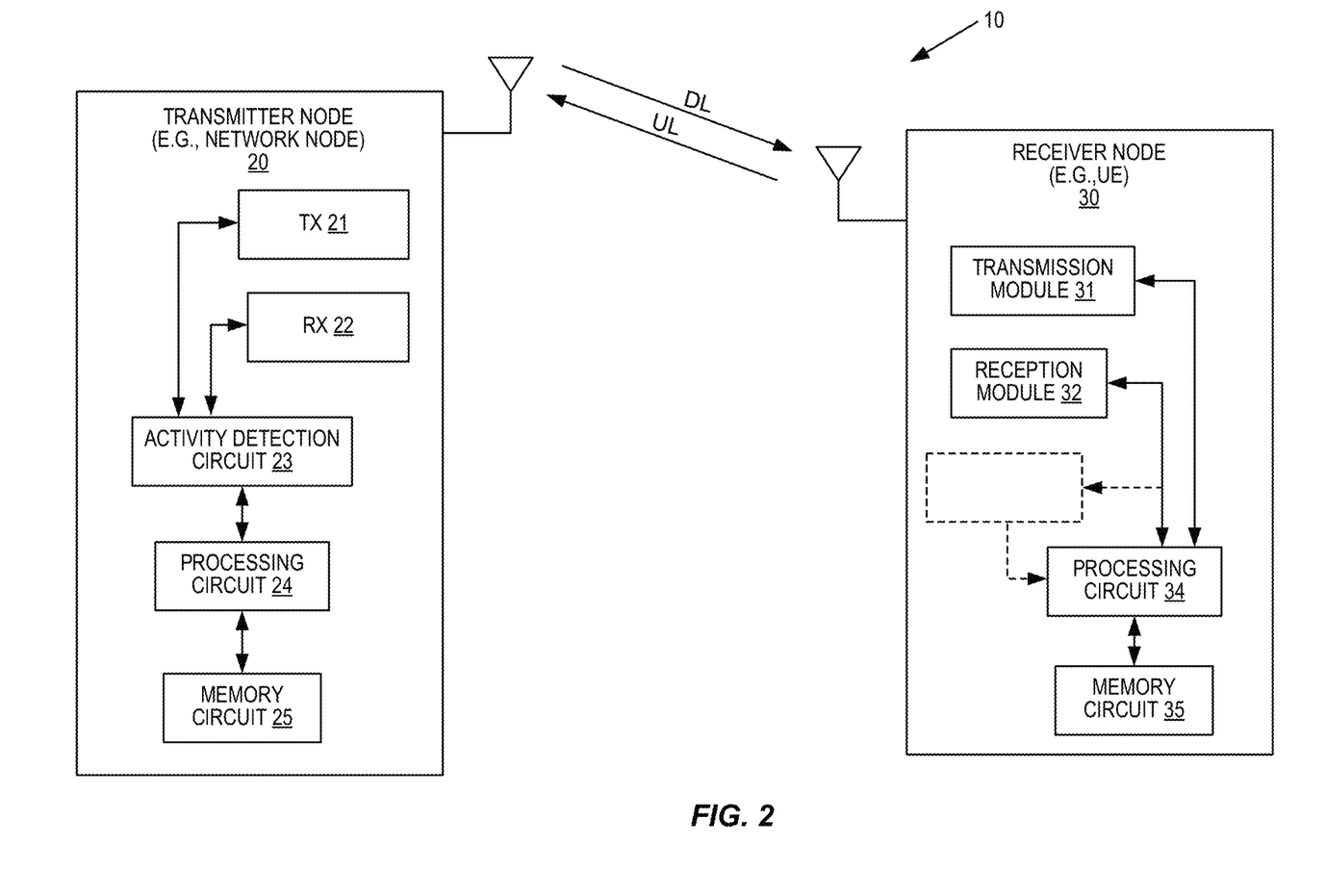
FIG. 2 shows an exemplary wireless communication system.

FIG. 2 shows one exemplary communication network 10 comprising a transmitter node 20 and a receiver node 30. The receiver node 30, which is served or managed by a first network node, e.g., network node 20, receives signals transmitted by the first network node, e.g., the network node 20. The receiver node 30 may also receive higher layer signaling messages from the first network node. The receiver node 30 may further be configured to receive signals from at least one additional second network node. Either or both of the first and second network nodes may be represented by the transmitter node 20 of FIG. 2. The serving cell (aka first cell) and at least one neighboring cell (aka second cell) are therefore operated by the first network node and the second network node, respectively. At least one of the first and the second network nodes operate using radio channel(s) belonging to an unlicensed spectrum. For example, the receiver node 30 may be served by the first cell operating with a radio channel belonging to the licensed spectrum, while also being configured to perform one or more radio measurements (aka neighbor cell measurements) on the second cell operating with a radio channel belonging to the unlicensed spectrum. For simplicity, the following assumes the transmitter node 20 operates with a radio channel belonging to an unlicensed spectrum or any radio channel requiring some type of LBT process.

In the example of FIG. 2, the transmitter node 20 comprises a network node, e.g., an eNodeB, and the receiver node 30 comprises a remote wireless communication device, e.g., a UE, where transmissions from the transmitter node 20 to the receiver node 30 travel via a downlink wireless radio channel. It will be appreciated, however, that the solution presented herein applies equally well for a transmitter node 20 and a receiver node 30 that alternatively comprise a UE and network node, respectively, where in this case the transmissions from the transmitter node 20 to the receiver node 30 travel via an uplink wireless radio channel. Generally, the solution presented herein results in the receiver node 30 only using reference signals in time resources that also include an indicator to execute one or more tasks. Exemplary tasks include, but are not limited to, performing one or more radio measurements, processing data, saving power by turning on or off one or more components in the receiver depending on whether the first or second indicator is received, sending a request to the transmitter node 20 for additional reference signals and/or a more dense distribution of reference signals, etc.

Figure 3:
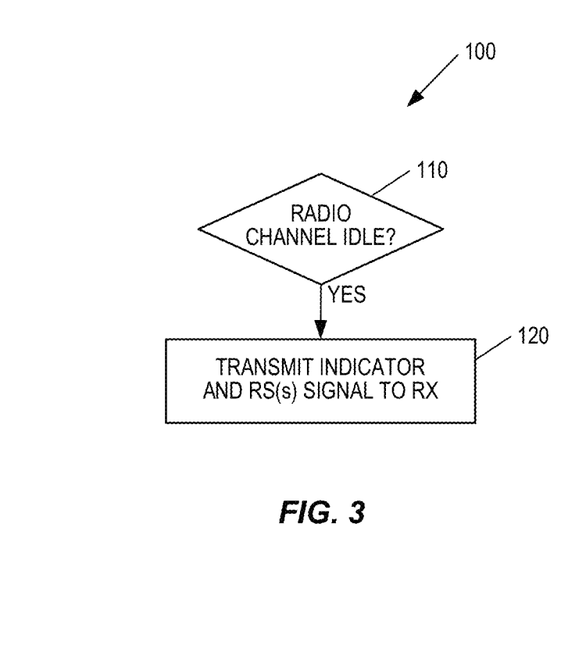
FIG. 3 shows a transmission method according to one exemplary embodiment.

More particularly, transmitter node 20 is configured to implement the method 100 of FIG. 3. To that end, the transmitter node 20 is configured to determine, during a first time resource, whether a wireless radio channel between the transmitter node 20 and the receiver node 30 is idle (block 110). If the radio channel is idle, the transmitter node 20 transmits an indicator in a second time resource (block 120). The indicator alerts the receiver 30 to the presence of one or more reference signals that are also present in the second time resource. As a result, the receiver node 30 will only attempt to process the reference signals in the second time resource if the receiver node 30 also receives the indicator in the second time resource.

In one exemplary embodiment, the transmitter node 20 comprises a transmission circuit (TX) 21, reception circuit (RX) 22, activity detection circuit 23, processing circuit 24, and memory 25, as shown in FIG. 2. RX 22 receives signals, e.g., from the receiver node 30. Processing circuit 24 controls the general operation of transmitter node 20 according to instructions stored in memory 25. The activity detection circuit 23 determines, during a first time resource, whether the radio channel between the transmitter node 20 and receiver node 30 is idle according to instructions stored in memory 25. The TX 21 subsequently transmits one or more indicators, in a second time resource, if the activity detection circuit 23 determines that the radio channel is idle during the first time resource. Though not required, the second time resource may occur immediately after the first time resource, e.g., the first and second time resources may be adjacent in time.

Figure 4:
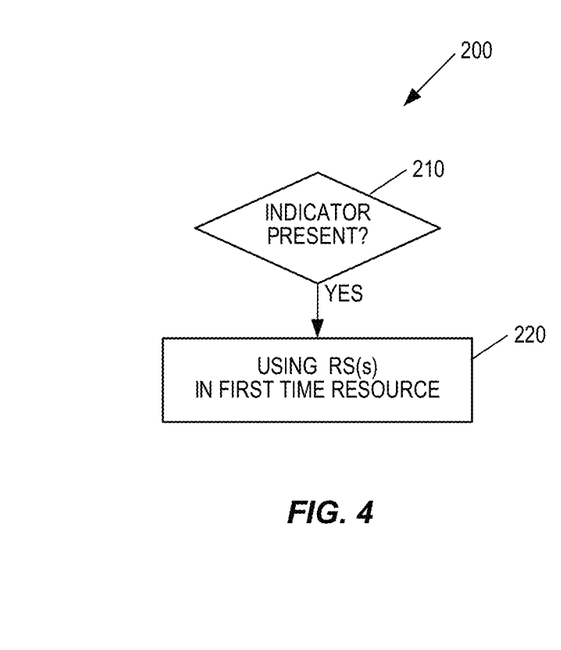
FIG. 4 shows a reception method according to one exemplary embodiment.

Receiver node 30 is configured to implement the method 200 of FIG. 4. More particularly, the receiver node 30 is configured to determine whether an indicator is present in a first time resource received from the transmitter node 20 via a wireless radio channel (block 210). If the indicator is present, the receiver node 30 uses one or more reference signals present in the first time resource to execute one or more tasks (block 220). As a result, the receiver node 30 will only attempt to process reference signals in the first time resource if the receiver node 30 receives the indicator in the first time resource. If the receiver node 30 does not detect any indicator in a time resource, the receiver node 30 may use this time resource for performing one or more radio tasks that don't require the reception and usage of the RSs. Examples of such tasks include the receiver node 30 turning off its radio receiver to save battery life, using processor resources for processing data received in previous time resources, using processor resources for processing data the receiver node 30 intends to transmit in one or more subsequent time resources, etc.

In one exemplary embodiment, the receiver node 30 may comprise a transmission circuit (TX) 31, reception circuit (RX) 32, optional detection circuit 33, processing circuit 34, and memory 35, as shown in FIG. 2. The TX 31 transmits signals to the transmitter node 20. The RX 32 receives a first time resource from the transmitter node 20, and processing circuit 34 determines whether an indicator is present in the first time resource. If so, the processing circuit 34 uses the reference signal(s) present in the first time resource to execute one or more tasks according to instructions stored in memory 35.

As noted above, the activity detection circuit 23 determines whether there is any signal activity in a first time resource. To that end, the activity detection circuit 23 may determine whether a radio channel is idle using, e.g., a CSMA protocol and/or a LBT procedure. For example, after the transmitter node 20 turns on or activates the RX 22 during the LBT slot (see FIG. 1), the activity detection circuit 23 may determine there is activity in the radio channel provided that a level of a signal received by the RX 22 and/or received signal quality on one or more radio channels belonging to the unlicensed spectrum are equal to or above their respective thresholds. In another exemplary implementation the activity detection circuit 23 may determine that there is activity provided that the received signal level and/or received signal quality of certain type(s) of radio signals on one or more radio channels belonging to the unlicensed spectrum are equal to or above their respective thresholds. Examples of certain types of radio signals include reference signals, e.g., CRS, PSS, SSS, etc. If the received signal level and/or received signal quality are below their respective thresholds, however, the activity detection circuit 23 determines there is little to no activity level on the channels of the unlicensed spectrum, and thus, that the radio channel is available.

Figure 5:
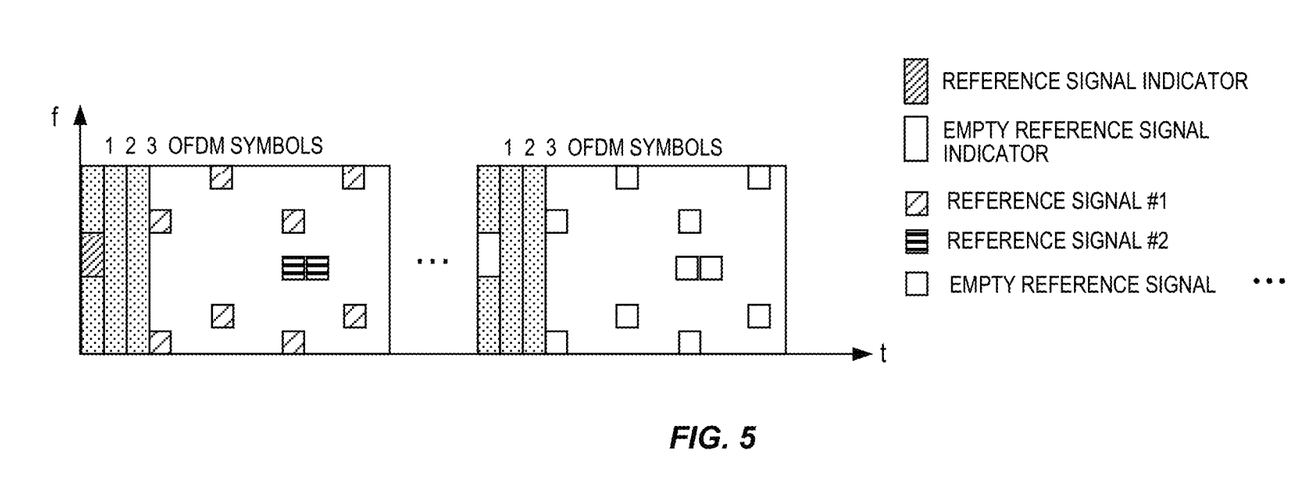
FIG. 5 shows a schematic diagram of exemplary subframes comprising exemplary reference signal indicators.
Figure 6:
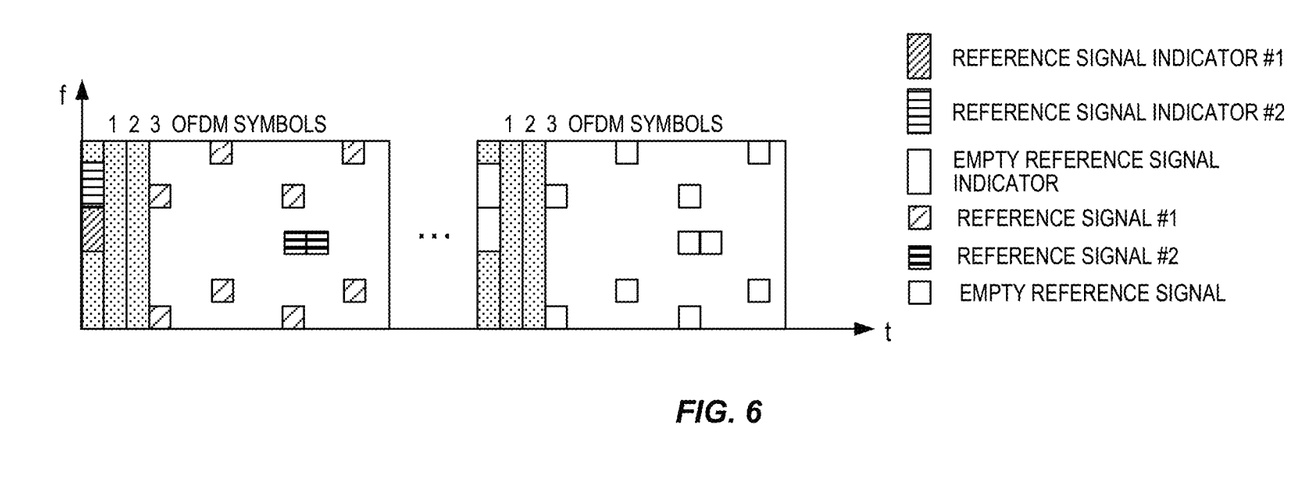
FIG. 6 shows another schematic diagram of exemplary subframes comprising exemplary reference signal indicators.

Once the activity detection circuit 23 determines a radio channel is available, the transmission circuit 21 transmits at least one indicator in a subsequent, e.g., second, time resource, as shown in FIGS. 5 and 6. The indicator may have a pre-defined format and/or may contain pre-defined information or content. For example, the indicator may comprise of or may be encoded with a pre-defined sequence. As an example, the sequence may correspond to the cell identity (e.g., physical cell ID (PCI)) of the cell for which the indicator is sent. The network node 20 may transmit the indicator in one or more pre-defined sets of physical resources. Examples of physical resources include symbols, resource elements, and resource blocks. For example, the network node 20 may typically transmit the indicator during a set of resource elements of the first symbol in a subframe. The indicator may also be sent in a set of physical resources, which are configured by the network node 20, e.g., the network node 20 informs the receiver node 30 about where to find the physical resources that carry the indicator. In cases where the network node 20 includes multiple indicators, the network node 20 may transmit one or more indicators in one or more pre-defined sets of physical resources, and transmit the remaining one or more indicators on configurable resources. The indicator(s) may be sent as part of a UE-specific signal sent to a specific UE 30, as part of a multi-cast or group cast signal sent to a group of UEs 30, or as part of a broadcast signal receivable by any/all UEs 30. Because the indicator is predefined, the indicator(s) can be detected by the UE 30. The network node 20, when transmitting the indicator(s) in the second time resource, therefore also retrieves information about the types of RS(s) to be sent in the same second time resource, and transmits the corresponding RS(s) using pre-defined physical resources and/or configurable physical resources.

There can be several variants of the indicators. For example, there can be one or a plurality of indicators that map to the transmission of different sets of reference signals. The following provides several exemplary embodiments to explain the indicator variants.

In one exemplary embodiment, network node 20 transmits one indicator, as shown in FIG. 5. The transmission of this indicator indicates that the network node 20 in the time resource where the indicator is sent also transmitted all types of reference signals that can be transmitted in that time resource and/or transmitted all reference signals (e.g., DRS, CSI-RS, MBSFN RS, etc.) that are pre-configured by the network node 20 for transmission. For example, in subframe #0 and subframe #5, the CRS, PSS, and SSS are transmitted. But during the remaining subframes, the PSS/SSS are not transmitted, whereas at least the CRSs are transmitted. However, in certain time resources, several combinations of RSs (e.g., CSI-RS, CRS, DRS, etc.) can be transmitted e.g., based on a pre-defined rule and/or configuration information sent by the network node 20. Therefore, the indicator sent in a second time resource may indicate that all such RSs are transmitted in this second time resource.

In another exemplary embodiment the network node 20 may transmit more than one indicator, as shown in FIG. 6. For example, each indicator informs the UE 30 about the transmission of one or more types of reference signals, where each type of reference signal is different. In this case, the first indicator is for alerting the UE 30 to the presence of one or more first reference signals, while the second indicator is for alerting the UE 30 to the presence of one or more second reference signals different from the one or more first reference signals. The mapping between each indicator and the transmission of a corresponding one or more types of reference signals can be pre-defined or configured by the network node 20. For example, one indicator may indicate that only the CRS is transmitted, while another indicator may indicate that PSSs/SSSs are transmitted. In yet another example, the indicator may indicate that the DRSs are transmitted; DRSs are generally sent periodically in one or more DRS burst (aka discovery burst) consisting of one or more DRS subframes. In yet another example, a separate indicator may indicate that CSI-RSs are transmitted.

In addition to indicating the presence of reference signals in the second time resource, the indicator may indicate whether the reference signal transmission is a normal RS transmission or is a compensated RS transmission. In a compensated RS transmission, as explained herein, the network node 20 transmits one or more additional sets of RSs beyond the "normal RS transmission" to compensate for the RS(s) that were not transmitted in one or more previous time resources, e.g., due to signal activity or to compensate for RS(s) that were transmitted but not correctly received by the UE 30, e.g., due to degradations in the wireless radio channel. The maximum amount of missed RSs and/or types of RSs that can be compensated for in subsequent time resources can be pre-defined and/or configured by the network node 20 (e.g., the UE 30 is pre-configured with such information). To distinguish between normal and compensated RS transmissions, the indicator may be encoded with different types of sequences or one or more bits can be appended to differentiate between them. The UE 30 may receive and use compensated RSs (e.g., RSs transmitted with higher density) for executing various tasks in order to further enhance the measurement performance (e.g., improve the accuracy of the measurement). The network node 20 uses one or more criteria or conditions to decide whether to perform compensated transmission of the RSs. Examples of such criteria include:

The network node 20 may not transmit the RSs in a time resource if the scheduled activity in that time resource is above a threshold.

The amount of missed RSs that can be compensated for in subsequent time resource(s) may also be limited, e.g., based on pre-defined rules and/or limits configured by the network node 20.

The network node 20 may compensate for the missed RSs within a certain time period (T1). The time period T1 may be pre-defined or configured by the network node 20. The time period T1 can be, for example, equal to a physical layer measurement period.

The network node 20 may compensate for the missed RSs provided that RSs are not transmitted in at least a number K of time resources over the last time period (T3).

The network node 20 may perform compensated transmission based on radio measurement results received from the UE 30 and/or responsive to an explicit request received from the UE 30. For example, if the radio measurement quality is below a threshold, the network node 20 may send or start sending compensated RSs in subsequent time resources.

The network node 20 may perform compensated transmission of the RSs responsive to a request for such received from the UE 30.

Figure 7:
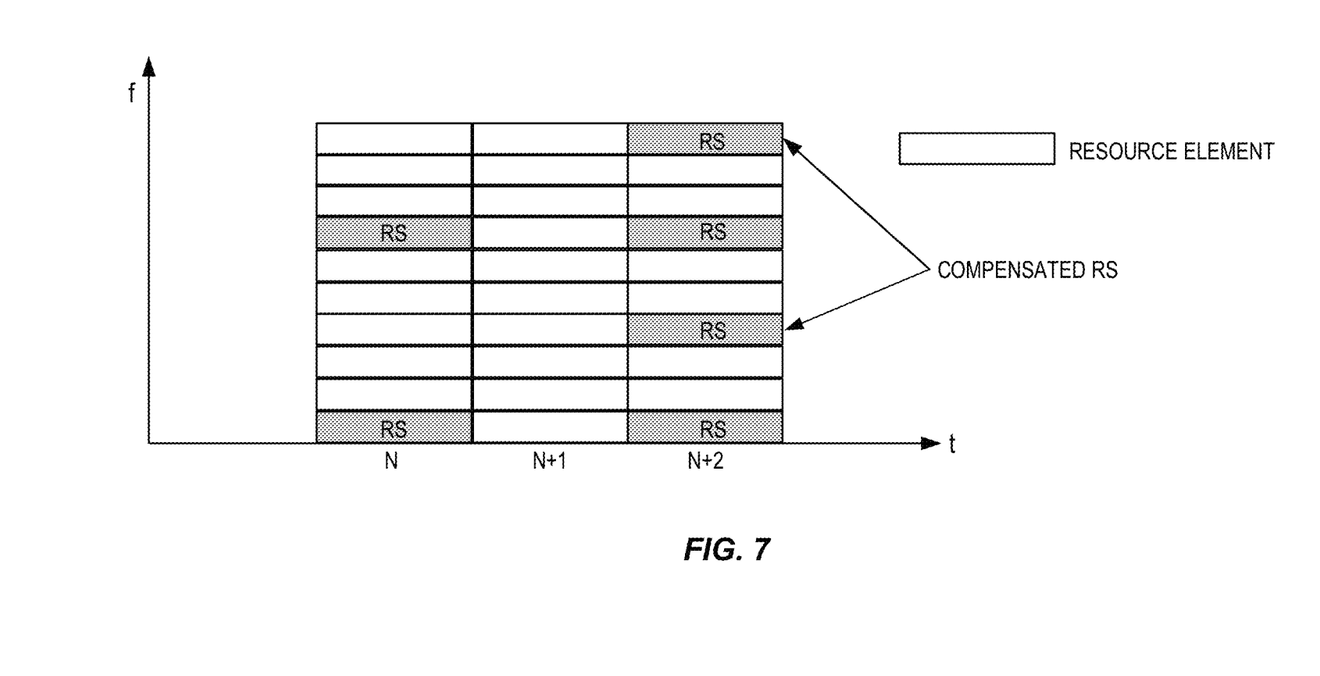
FIG. 7 shows an exemplary schematic of compensated RS transmission.

One exemplary method of compensated RS transmission assumes that in a time resource N, the network node 20, due to activity, does not transmit any CRS and CSI-RS, which are transmitted in every $6^{th}$ and $4^{th}$ resource elements, respectively, in certain symbols. But in the next time resource, or in any subsequent time resource N+n, the network node 20 does not detect any activity, and therefore transmits the CRS and CSI-RS in every $3^{rd}$ and $2^{nd}$ resource elements, respectively, in their respective symbols. The parameter n denotes the difference between the next available time resource where the RS can be transmitted because of low or non-existent signal activity and the time resource where no RS is transmitted due to signal activity. In this way their transmission density is doubled in time resource N+n (e.g., by transmission the regular $6^{th}$ and $4^{th}$ resource elements and the added $3^{rd}$ and $2^{nd}$ resource elements). In the same example, in another implementation, the network node 20 may only compensate for the missed CSI-RS and not for the missed CRS. That is, the network node 20 may transmit CRS and CSI-RS in every $6^{th}$ and $2^{nd}$ resource elements respectively in their respective symbols. Increasing the CRS density can be implemented by configuring a higher number of antenna ports in the network node 20. For example, if the network node 20 has a single transmit antenna, it is already configured with a single antenna port CRS pattern. By configuring the network node 20 with two antenna ports, even though it has a single transmit antenna, the CRS pattern increase its density by a factor of two. The connected UEs 30 receive the information regarding the number of antenna ports by means of RRC signaling. In the case of CSI-RS, the density can be increased in the frequency domain either by assigning more CSI-RS configurations, or in the time domain by reducing the periodicity of the CSI-RS transmissions. FIG. 7 shows an example of a compensated transmission of reference signals in case n=2. In this example, we assume that the reference signal RS must be transmitted in every $6^{th}$ resource element in each time resource. During time resource N+1, the network node 20 detects activity in the channel and defers from transmitting the RS. In the subsequent time resource, N+2, the network node 20 does not detect any activity, so it is allowed to transmit the RS. The RS is transmitted now in every $3^{rd}$ resource element in order to compensate for the missing RSs in time resource N+1.

In another example, the network node 20 transmits the missed CRS and CSI-RS in N+n time resources with double density only if the value of n is less than or smaller than certain threshold, e.g., n=10.

In some embodiments, the UE 30 may be preconfigured to know to look for the indicator before processing any reference signals. In other embodiments, the network node 20 may transmit an indicator control signal to the UE 30 to inform the receiver node 30 that only time resources containing at least one reference signal indicator also contain RS(s). Further, the reception circuit 22 in the network node 20 may receive capability information from the UE 30. Such capability information informs the network node 20 of a capability of the UE 30 to detect and/or interpret the indicator described herein.

As noted above, the UE 30 determines whether one or more indicators are present in a received time resource, where the one or more indicators indicating that one or more reference signals are transmitted in the same time resource as the indicator(s). In one exemplary embodiment, the UE 30 may attempt to detect the presence of the indicator(s) in every $K^{th}$ time resource; where, as a special case, K=1 (e.g., there is an indicator in every time resource). In another exemplary embodiment, the UE 30 may attempt to detect the presence of the indicator(s) in only those time resources where the UE 30 intends to receive one or more reference signals. In yet another exemplary embodiment, if the UE 30 has not detected an indicator in the last L time resources (e.g., no RS transmissions), the UE 30 may attempt to detect the presence of the indicator(s) in at least the next L consecutive time resources. The UE 30 may detect the indicator by correlating the received signal of the indicator with one or more possible sequences or signal formats that are used for transmitting the indicators as described herein. If the outcome of the signal correlation is above a threshold, the UE 30 may assume the indicator is present. The UE 30 may also decode any information embedded or encoded in the indicator(s) to determine other relevant information, e.g., types of RSs transmitted in the second time resource, whether compensated RS are transmitted, etc.

More particularly, the UE 30, based on the received indicator, pre-defined information, and/or on a configuration message (previously received from the network node 20), may also obtain more detailed information related to the reference signals that are transmitted in the second time resource. The detailed information may comprise of one or more of the type of the reference signals, a density of the reference signals (e.g., normal or compensated RS transmission), etc. The UE ode 30 may then decide to receive and use one or more RSs transmitted in the second time resource. The UE 30, for example, may use the received RSs for performing one or more radio measurements.

As noted above, the receiver node 30 may be configured to receive signals from multiple network nodes associated with multiple cells. The receiver node 30 may therefore separately receive indicators regarding the transmission of RSs from each cell. In this case, the receiver node 30 performs the method of FIG. 4 for each transmitter node 20.

While not required, the UE 30 may first determine whether the network node 20 is operating or has the capability of operating in the unlicensed spectrum. To that end, the UE 30 may include a detection circuit 33 that determines whether one or more cells in the UE's coverage area are operating over radio channels that belong to the unlicensed spectrum. For example, the UE 30 may receive information about one or more radio channels in a measurement configuration from the first cell for performing radio measurements on cells operating on these radio channels. Examples of radio channel information include frequency carrier numbers, E-UTRA Radio Frequency Channel Number (EARFCN), frequency band indictors, etc. The radio channel numbers and band indicators are typically unique, and are also pre-defined or indicated to the UE 30 by the network node 20 regardless of whether the indicated radio channels and/or bands belong to the licensed or unlicensed spectrum. For example, in one region a certain part of the spectrum is allowed to be operated as unlicensed, whereas in another region the same spectrum can be operated only as licensed spectrum. The detection circuit 33, based on this acquired information, may determine that the radio channels belong to unlicensed spectrum. In another exemplary implementation, detection circuit 33 may also autonomously detect that unlicensed spectrum is being operated in certain area. For example, UE 30 supporting such unlicensed spectrum may autonomously perform cell identification over a certain frequency range. If any signal is detected, the UE 30 assumes that a certain range of radio channels in the unlicensed spectrum is operational in that region. UE 30 may also use stored data or historical information regarding the operation of the unlicensed spectrum in the area where the UE 30 is operating. Alternatively, UE 30 may determine that network node 20 is operating according to a LBT procedure responsive to an indicator control signal received from the network node 20. In this case, the indicator control signal informs UE 30 that only time resources containing at least one reference signal indicator also contain RS(s).

As noted above, the network node 20 may transmit additional ("compensated") RS(s) in the same time resource as the indicator. In some embodiments, the transmission of such compensated RS(s) is in response to a request for a compensated RS transmission sent by the UE 30 to the network node 20, e.g., before the reception of a time resource containing the indicator(s) and reference signal(s). In this embodiment, the UE 30 may optionally send a request to a network node 20 that the UE 30 needs to or prefers to receive one or more types of RSs with a higher density in at least a certain number of time resources and/or over a certain time period from one or more cells operating on unlicensed spectrum. The request message may also include additional information, e.g., an identifier of cells from which denser RSs are desired by the UE 30, the amount by which the RSs should be increased, etc. The UE 30 may send such a request based on one or more criteria or when one or more conditions are met. For example, if the UE 30 did not receive sufficient RSs in the last certain number of time resources, the UE 30 may send this request to the network node 20. In another exemplary implementation, if the signal quality of one or more radio measurements performed on one or more RSs is below their respective thresholds, the UE 30 may send this request to the network node 20. The aim of the request is to receive compensated RSs (e.g., with higher density) in at least a certain number of subsequent time resources from one or more cells. Typically, a first network node (e.g., the serving network node) receives this request. If the request is related to a neighboring cell, the first network node may forward the request to a neighboring network node (e.g., the first eNB forwards the request to one or more second sets of eNodeBs over an X2 interface). The network node 20 receiving this request directly from the UE 30, or implicitly via another network node, takes into account the received message/request to decide whether to send compensated RSs in one or more subsequent time resources. As described previously, the network node 20 may also take into account a plurality of criteria, including the requests received from the UE 30, to decide whether to transmit the compensated RSs. For example, the network node 20 may transmit the compensated RSs in one or more time resources only if it has received a request from at least X UEs 30 and/or if the signal quality is lower than a threshold for at least Y UEs 30.

The UE 30 may also optionally signal capability information related to receiving an indicator for determining and using reference signal transmissions to the network node 20. According to this embodiment, a UE 30 signals the capability information to a network node 20 (e.g., an access point, base station, NodeB, eNodeB, relay, core network (e.g., MME), etc.) to inform the network node 20 as to whether the UE 30 is capable of detecting one or more indicators transmitted by the network node 20 in a time resource, and based on the detected indicators, whether the UE 30 is further capable of determining whether one or more RSs are transmitted by the network node 20 in the time resource. More specifically, the UE capability information indicates the UE 30 is capable of any one or more procedures disclosed in any one or more of the preceding embodiments. The capability information is typically sent via higher layer signaling (e.g., RRC signaling) to the network node 20. The capability information may be sent during initial call setup or after cell change (e.g., handover, etc.) or during the session or call. The acquired UE capability information may optionally be used by the network node 20 for performing one or more radio operation tasks or network management tasks. Such tasks include but are not limited to:

forwarding the received UE capability information to another network node, which may use it after cell change of the UE;

sending an indictor to indicate whether RSs are transmitted provided that the UE is capable of detecting and interpreting the meaning of the indicator as indicated by the UE in its capability information;

using the received capability information to decide which type(s) of indicator(s) should be sent to the UE, e.g., one that maps to all types of RSs, one that maps to only CRS, etc.; and storing the received capability information and using it in the future, e.g., when the same UE intends to receive RSs from the network node.

As discussed above, the solution presented herein applies to any physical resources needing to be sent from transmitter node 20 to receiver node 30. Receiver node 30 performs one or more tasks using the received physical resources, e.g., cell selection/reselection, positioning, etc. In one embodiment, the UE has to first detect or identify a cell using PSS/SSS and therefore cell identification, e.g., acquisition of a PCI, also comprises a signal measurement. The UE may also have to acquire the Cell Global ID (CGI) of a cell based on a Master Information Block (MIB) and a System Information Block 1 (SIB1) transmitted on the Physical Broadcast Channel (PBCH) and Physical Downlink Shared Channel (PDSCH), respectively. Therefore, a cell search (aka cell detection or cell identification), CGI acquisition, etc., are also types of tasks performed using the physical signals.

The Reference Signal Received Power (RSRP) and Reference Signal Received Quality (RSRQ) may be used for at least Radio Resource Management (RRM), e.g., for mobility, which includes mobility in the RRC connected state as well as in the RRC idle state. The RSRP and RSRQ are also used for other purposes, e.g., for enhanced cell ID positioning, minimization of drive test, etc., and are measured on Cell-specific Reference Signal (CRS). The measurement (e.g., RSRP, RSRQ, etc.) typically includes non-coherent averaging of two or more basic non-coherent averaged samples. For example, the UE typically obtains the overall RSRP/RSRQ measurement quantity result by collecting four or five non-coherent averaged samples or snapshots (e.g., each of 1-2 ms in length) during the physical layer measurement period (e.g., 200 ms).

In the RRC connected state, the UE can perform intra-frequency measurements without measurement gaps. However, as a general rule, the UE performs inter-frequency and inter-RAT measurements in the measurement gaps unless it is capable of performing them without gaps.

The UE 30 may also perform measurements on the serving cell (aka primary cell) in order to monitor the serving cell performance. This is referred to as Radio Link Monitoring (RLM) or RLM-related measurements in LTE. For RLM, the UE monitors the downlink link quality based on the CRS in order to detect the downlink radio link quality of the serving or PCell. In order to detect whether out of sync and in sync, the UE compares the estimated quality with the thresholds $Q_{out}$ and $Q_{in}$ respectively. The threshold $Q_{out}$ and $Q_{in}$ may be defined as the level at which the downlink radio link cannot be reliably received, and corresponds e.g., to a 10% and 2% block error rate of hypothetical PDCCH transmissions respectively, respectively.

Examples of UE positioning measurements in LTE include Reference Signal Time Difference (RSTD) and UE RX-TX time difference measurement. The UE RX-TX time difference measurement requires the UE to perform measurements on the downlink reference signal as well as on the uplink transmitted signals. The RSTD measurement is performed by the UE on Positioning Reference Signal (PRSs) transmitted by a reference cell and a neighbor cell. PRSs are sent by the eNode B during PRS subframes in a positioning occasion, which occurs periodically.

CSI measurements performed by the UE are used for scheduling, link adaptation, etc., by the network. Examples of CSI measurements include Channel Quality Indicator (CQI), Precoding Matrix Indicator (PMI), Rank Indicator (RI), etc. CSI measurements may be performed on reference signals, e.g., CRS, CSI-RS, or DMRS.

The core of the solution presented herein is that the transmitter node 20, operating on a radio channel belonging to the unlicensed spectrum, upon detecting there is low or no activity on the radio channel in a first time resource (e.g., a first subframe), transmits in a subsequent second time resource (e.g., a second subframe) one or more indicators. The transmitted indicators indicate or are encoded with the message that one or more types of reference signals are transmitted by the transmitter node 20 in the second time resource. The UE 30, upon detecting the presence of the indicator (e.g., if the UE 30 receives it correctly), processes the reference signals present in the second time resource. In some embodiments, the UE 30 may also determine the types of reference signals transmitted by the transmitter node 20 in a time resource and use the determined information to perform radio measurements.

Various elements disclosed herein, e.g., a transmitter node, receiver node, transmission circuit, reception circuit, processing circuit, memory, determining circuit, activity detection circuit, etc., are implemented in one or more circuits. Each of these circuits may be embodied in hardware and/or in software (including firmware, resident software, microcode, etc.) executed on a controller or processor, including an application specific integrated circuit (ASIC).

Figure 8:
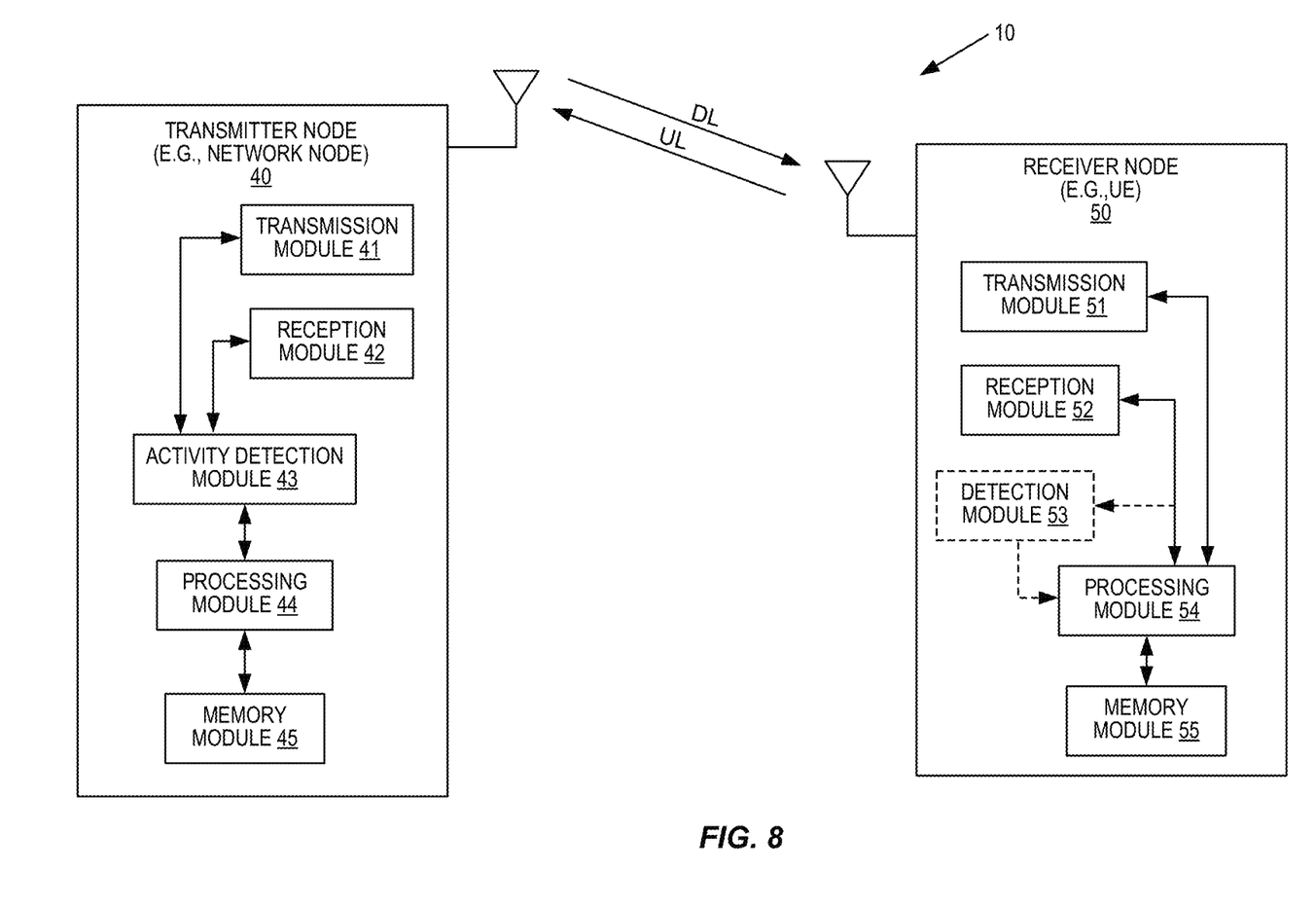
FIG. 8 shows another exemplary wireless communication system.

The solution presented herein is described in terms of various circuits in transmitter and receiver nodes. FIG. 8 shows another exemplary embodiment where wireless communication network 10 includes a transmitter node 40 and a receiver node 50 that include various modules for executing the methods of FIGS. 3 and 4. More particularly, the transmitter node 40 comprises a transmission module 41, reception module 42, activity detection module 43, processing module 44, and memory module 45. Processing module 44 controls the general operation of the transmitter node 40 according to instructions stored in memory module 45. Receiver module 42 receives signals, e.g., from the receiver node 50. The activity detection module 43 determines, during a first time resource, whether the radio channel between the transmitter node 40 and receiver node 50 is idle (block 110) according to instructions stored in memory module 45. The transmission module 41 subsequently transmits one or more indicators, in a second time resource, if the activity detection module 43 determines that the radio channel is idle during the first time resource (block 120). Receiver Node 50 comprises a transmission module 51, reception module 52, optional detection module 53, processing module 54, and memory module 55. The transmission module 51 transmits signals to the transmitter node 40. The reception module 52 receives a first time resource from the transmitter node 40, and processing module 54 determines whether an indicator is present in the first time resource. If so, the processing module 54 uses the reference signal(s) present in the first time resource to execute one or more tasks according to instructions stored in memory module 55. Optional detection module 53 optionally determines whether one or more cells in the coverage area of the receiver node 50 are operating over radio channels that belong to the unlicensed spectrum.

The solution presented herein may also be implemented in a computer program product stored in a non-transitory computer readable medium for controlling a transmitter node 20. The computer program product comprises software instructions which, when run on the transmitter node 20, causes the transmitter node 20 to determine whether a radio channel between the transmitter node 20 and a receiver node 30 is idle during a first time resource, and subsequently transmit an indicator from the transmitter node 20 if the radio channel is idle during the first time resource. The indicator is for alerting the receiver node 30 to the presence of one or more reference signals in the second time resource, where the second time resource occurs after the first time resource. Further, the solution presented herein may be implemented in a computer program product stored in a non-transitory computer readable medium for controlling a receiver node 30. The computer program product comprises software instructions which, when run on the receiver node 30, causes the receiver node 30 to determine whether an indicator is present in a first time resource received from a transmitter node via 20 a wireless radio channel. If the indicator is present in the first time resource, the software instructions cause the receiver node 30 to use one or more reference signals present in the first time resource to execute one or more tasks.

The solution presented herein achieves several advantages. First, the receiver node 30 does not have to blind detect in every time resource (e.g., subframe) whether reference signals are transmitted. This saves the battery life of the receiver node 30, reduces processing, and saves memory of the receiver node 30. The solution also enables the receiver node 30 to use reference signals for measurements only when they are transmitted by the transmitter node 20 operating in unlicensed spectrum. This prevents false detection of reference signals, which in turn avoids any degradation in measurement performance because no bias is introduced in the measurement. The solution also enables the transmitter node 20 to compensate for missed RSs in a previous time resource (e.g., subframe P) by transmitting them with higher density in subsequent time resources (e.g., subframe P+p). This enables the receiver node 30 to enhance the measurement performance by measuring on more dense RSs in certain time resource(s).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented in a receiver node configured to communicate with a transmitter node via a wireless radio channel, the method comprising:
   determining whether a first indicator is present in a first time resource received from the transmitter node via the wireless radio channel;
   if the first indicator is present in the first time resource, using one or more first reference signals present in the first time resource to execute one or more tasks;
   determining whether a second indicator is present in the first time resource; and
   if the second indicator is present in the first time resource, processing one or more second reference signals present in the first time resource;
   wherein:
     the one or more second reference signals are of a different type than the one or more first reference signals; and
     the second indicator differs from the first indicator.

2. The method of claim 1, further comprising sending, before the reception of the first time resource, a request from the receiver node to the transmitter node for one or more compensated reference signal transmissions.

3. The method of claim 1, further comprising:
   receiving one or more compensated reference signals present in the first time resource; and
   processing the one or more compensated reference signals if the first indicator is present in the first time resource.

4. The method of claim 1, wherein the first indicator indicates the wireless radio channel between the transmitter node and the receiver node is idle during a previous time resource occurring before the first time resource.

5. The method of claim 1, further comprising, if the first indicator is not present in the first time resource, refraining from using signals present in the first time resource for the one or more tasks.

6. The method of claim 1, further comprising receiving an indicator control signal from the transmitter node, the indicator control signal informing the receiver node that only time resources containing a reference signal indicator also contain reference signals.

7. The method of claim 1, further comprising sending capability information to the transmitter node, the capability information informing the transmitter node of a capability of the receiver node to detect and interpret the first indicator.

8. The method of claim 1, wherein the one or more tasks comprise:
   performing one or more radio measurements;
   processing data;
   saving power by turning on or off one or more components in the receiver node depending on whether the first or second indicator is received; and
   sending a request to the transmitter node for at least one of additional reference signals and a more dense distribution of reference signals.

9. A receiver node configured to communicate with a transmitter node via a wireless radio channel, the receiver node comprising:
   a processing circuit configured to:
     determine whether a first indicator is present in a first time resource received from the transmitter node via the wireless radio channel;
     if the first indicator is present in the first time resource, use one or more first reference signals present in the first time resource to execute one or more tasks;
     determine whether a second indicator is present in the first time resource; and
     if the second indicator is present in the first time resource, process one or more second reference signals present in the first time resource;
   wherein:
     the one or more second reference signals are of a different type than the one or more first reference signals; and
     the second indicator differs from the first indicator.

10. The receiver node of claim 9, further comprising a transmission circuit configured to send, before the receiver node receives the first time resource, a request to the transmitter node for one or more compensated reference signal transmissions.

11. The receiver node of claim 9, further comprising a reception circuit configured to receive one or more compensated reference signals present in the first time resource, wherein the processing circuit is further configured to process the one or more compensated reference signals.

12. The receiver node of claim 9, wherein the first indicator indicates the wireless radio channel between the transmitter node and the receiver node is idle during a previous time resource occurring before the first time resource.

13. The receiver node of claim 9, wherein the processing circuit is further configured to, if the first indicator is not present in the first time resource, refrain from using signals present in the first time resource for the one or more tasks.

14. The receiver node of claim 9, further comprising a reception circuit configured to receive an indicator control signal from the transmitter node, the indicator control signal informing the receiver node that only time resources containing a reference signal indicator also contain reference signals.

15. The receiver node of claim 9, further comprising a transmission circuit configured to send capability information to the transmitter node, the capability information informing the transmitter node of a capability of the receiver to detect and interpret the first indicator.

16. The receiver node of claim 9, wherein the one or more tasks comprise:
   a performance of one or more radio measurements;
   a processing of data;
   a saving of power by turning on or off one or more components in the receiver node depending on whether the first or second indicator is received; and
   a sending of a request to the transmitter node for at least one of additional reference signals and a more dense distribution of reference signals.

17. A non-transitory computer readable medium storing a computer program product for controlling a receiver node, the computer program product comprising software instructions which, when run on the receiver node, causes the receiver node to:
- determine whether an indicator is present in a first time resource received from a transmitter node via a wireless radio channel; and
- if the indicator is present in the first time resource, use one or more reference signals present in the first time resource to execute one or more tasks;
- determine whether a second indicator is present in the first time resource; and
- if the second indicator is present in the first time resource, process one or more second reference signals present in the first time resource;
- wherein:
  - the one or more second reference signals are of a different type than the one or more first reference signals; and
  - the second indicator differs from the first indicator.

* * * * *